W. MENNIE.
DIFFERENTIAL GEARING.
APPLICATION FILED MAY 13, 1915.

1,193,709.

Patented Aug. 8, 1916.
2 SHEETS—SHEET 1.

Witness
E. H. Barrett

Inventor
William Mennie,
By Pagelsen & Spencer
Attorneys

UNITED STATES PATENT OFFICE.

WILLIAM MENNIE, OF DETROIT, MICHIGAN, ASSIGNOR OF FORTY-NINE ONE-HUNDREDTHS TO CARL A. FETTIG, OF DETROIT, MICHIGAN.

DIFFERENTIAL GEARING.

1,193,709.  Specification of Letters Patent.  Patented Aug. 8, 1916.

Application filed May 13, 1915. Serial No. 27,743.

*To all whom it may concern:*

Be it known that I, WILLIAM MENNIE, a citizen of the Dominion of Canada, residing at Detroit, in the county of Wayne and State of Michigan, have invented a new and useful Differential Gearing, of which the following is a specification.

The differential gearing constructions in common use on motor vehicles are subject to the objection that considerable friction between the wheels and the roadway is necessary to prevent spinning—thus with one wheel deep in the mud and the other resting on a relatively smooth surface the latter is apt to be turned alone while the former receives no effectual rotative force.

One object of the present invention is to provide means whereby a very small frictional or other resistance to the turning of either wheel insures a transmission into the other of a proportion of the total turning moment which corresponds more nearly to the resistance being offered thereto. In other words, when a motor vehicle is stalled, a small resistance offered to the wheel standing on a relatively smooth surface insures a much larger force being sent into the wheel that is prevented from turning by the conditions of the roadway.

A further object is to provide convenient means for locking one side of the differential so that, when used in connection with a jack shaft, breakage of the chain on one side will not prevent the vehicle from being driven.

The invention will be more fully understood from the following description and drawings, in the latter of which—

Figure 1:
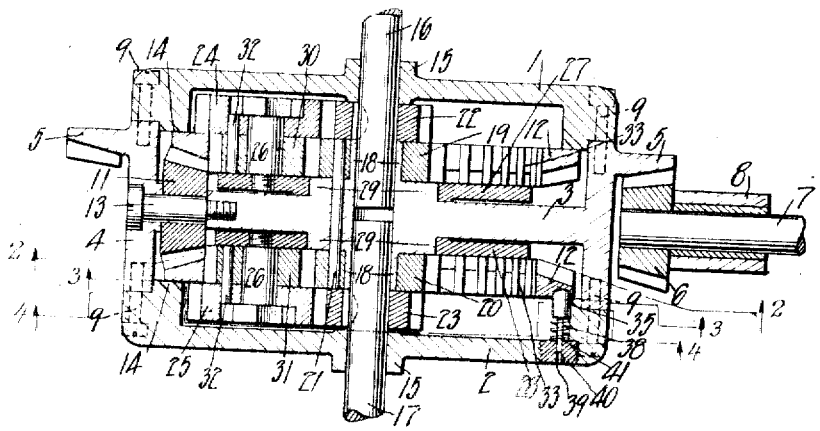
Figure 2:
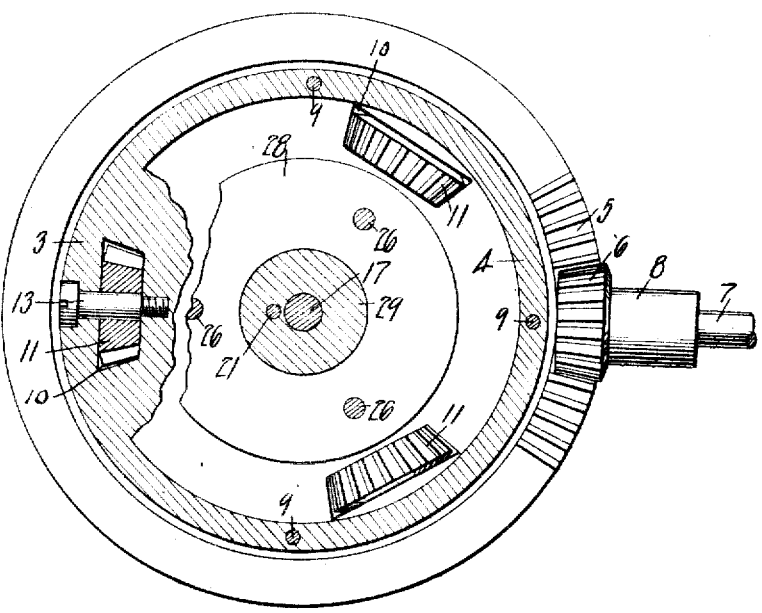
Figure 3:
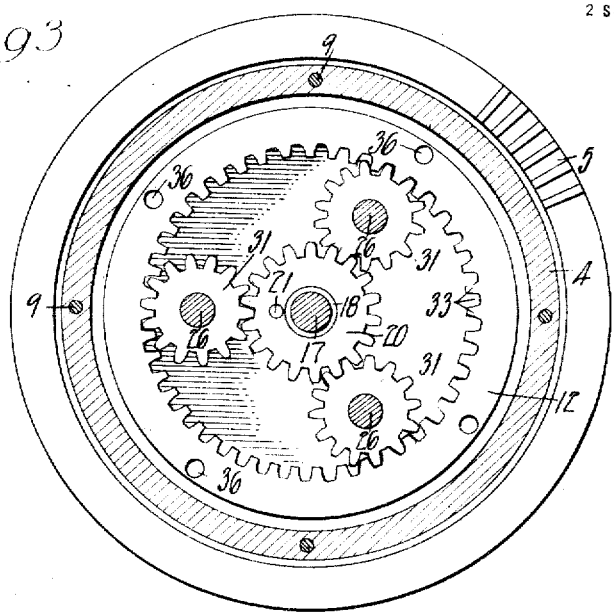
Figure 4:
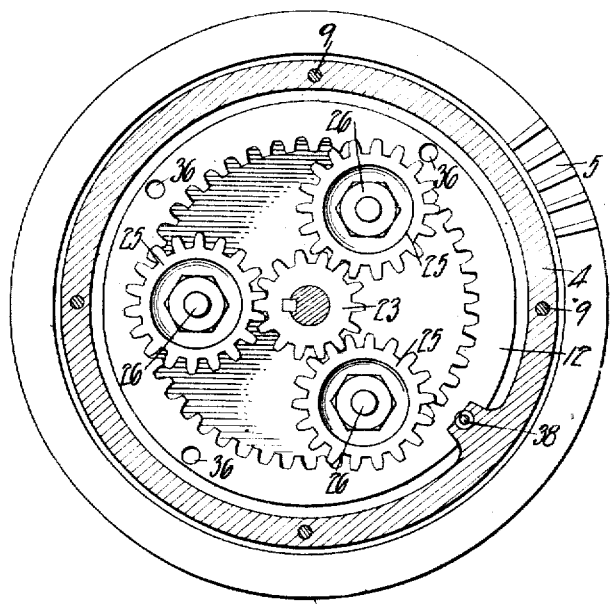

Figure 1 is a horizontal section through a preferred embodiment of the invention. Fig. 2 is a section on the line 2—2 of Fig. 1. Fig. 3 is a section on the line 3—3 of Fig. 1. Fig. 4 is a section on the line 4—4 of Fig. 1.

Similar reference characters refer to like parts.

In the embodiment shown, the differential gearing structure is contained in a casing consisting of the ends 1 and 2, a central wall or partition 3 and a ring 4, preferably integral with the partition. Formed integral with the casing, or otherwise rigidly connected thereto, is any desired power-receiving means, the bevel gear 5 shown in the drawings being in mesh with a pinion 6. This pinion may be mounted on a shaft 7 carried in any proper bearing 8. The ends 1 and 2 may be secured to the inner ring 4 by means of screws or bolts 9, as shown in dotted lines in Fig. 1, and the inner wall 3 is formed with openings 10 to receive the bevel pinions 11 that mesh with the similar differential gear rings 12. These bevel pinions are preferably mounted on screws 13 whose heads may be engaged from the outside of the ring 4. The gear rings may be held in proper mesh with the differential pinions by means of shoulders 14 formed on the ends 1 and 2; and the latter are preferably formed with hubs 15 in which the shafts 16 and 17 are rotatably mounted. These shafts are also rotatable in hubs 18 formed on the dividing plate 3, and the hubs also serve as mountings for the spur gears 19 and 20, that are connected to the partition 3 by the pin 21, or in any other desired manner.

Secured to the shafts 16 and 17, respectively, are the pinions 22 and 23, which mesh with the gears 24 and 25 mounted on pins 26 that are carried by the rings 27 and 28, supported on the enlargements 29 of the hubs 18 of the central plate. These gears 24 and 25 are connected to the pinions 30 and 31, respectively, in any desired manner, pins 32 being shown in the drawings; and the pinions mesh with the gears 19 and 20 and with the teeth 33 formed on the interior of the gear rings 11 and 12. The sets of gears 24 and 25 will preferably be of the same size, as will also be the gears 30 and 31. The ratio between these gears may be changed as desired to increase or decrease the turning moment exerted thereby. The gears 24, 25, 30 and 31 are planetary gears and serve to drive the shafts 16 and 17 in the same direction as the gear 5. The differential pinions 11 between the gear rings permit relative rotation of the shafts 16 and 17.

In ordinary differential gearing of the general character shown in the drawings, if one of the shafts is stationary, the other will revolve twice as fast as the carrier of the differential pinions; and if there were no friction, there would be no stress on the stationary shaft until a stress is placed upon the revolving shaft, which causes the equal stress upon the stationary shaft. In the present construction, however, if a stress is placed upon the revolving shaft, the stress upon the stationary shaft is greatly multiplied. When this differential gearing structure is applied to a motor vehicle, and one of the driving wheels of the vehicle sinks into a rut in such a manner that the other, while still in contact with the roadway, revolves comparatively freely, the force brought to bear upon the wheel in the rut because of the arrangements of the planetary gears is such that instead of remaining idle, the last mentioned wheel will continue to revolve until the difference in stresses on the two wheels becomes very great. This is caused by the leverage of the planetary pinions. When the pinions 20—23 are of the same size and the planetary pinions 25—31 are also of the same size, no differential action occurs and the shafts 16 and 17 will turn as if they were integral with the part 3. To attain differential action the pinions 20—23 must be of different diameters and at the same time, the diameters of the planetary pinions must be correspondingly changed. If now the case is revolved by means of the pinions 6, the pinion 11 being omitted, the planetary pinions and gear rings on both sides of the wall 3 will revolve freely without doing any work. When the pinions 11 are inserted, this free movement of the planetary pinions is restrained. The means of the pinions 6, the pinion 11 being the pinions 19—20, the greater will be the leverage and the greater will be the tendency of the two shafts 16 and 17 to revolve in the same direction.

When the device is used in connection with a jack shaft and chain (in which case the shafts 16 and 17 are the jack shaft sections), it becomes advisable, on account of the liability of breakage of one or the other of the chains, to provide means for preventing at will the rotation of the section of the jack shaft leading to the broken chain, in order that the driving force may be transmitted to the wheels through the other section and chain. One means for accomplishing this is indicated in Fig. 1, and consists in a locking bolt having a rounded head 35 arranged to engage with any one of a series of notches or holes 36 (Fig. 3 and 4) formed in the outer face of the corresponding gear ring 12. The shank 38 of the bolt may slide in the guide 39 formed in the plug 40, threaded into the end of the casing, and a spring 41, interposed between the bolt head and the plug, forces the bolt into one of the holes 36. It will be understood that the locking bolt and spring are normally removed, and are inserted in the position shown only upon breakage of the chain or other connection from one of the jack shaft sections to the corresponding wheel. When removed, the threaded opening may be closed by the plug 40 or in any other desired manner; when the locking bolt is in the position shown, it prevents rotation of the corresponding ring 12 in respect to the casing, which, in turn, prevents rotation of the pinions 11 and causes the entire gearing, together with the shafts 16 and 17, to turn as one member with the casing. This casing will preferably be filled, at least partially, with a proper lubricant. The gears 19, 20, 24 and 25 are shown in the drawings to be provided with eighteen teeth while the pinions 22, 23, 30 and 31 are shown provided with fourteen teeth, but it should be understood that this proportion is merely illustrative. In case a greater turning moment on the mired wheel is desired, the pairs of gears 24—30 and 25—31 may be so proportioned that they will be of more nearly the same pitch diameter. The gears 22—19 and 23—20 must also be proportioned so as to properly mesh with the planetary gears.

It is clear that many changes may be made in the details of construction without departing from the spirit of my invention. I do not, therefore, wish to be limited otherwise than as indicated by the subjoined claims.

I claim:—

1. A differential construction comprising in combination with alined sections of a divided shaft, supporting means rotatable about the axis of the divided shaft, a differential pinion carried by the supporting means, opposed gears driven by the differential pinion, a pair of gears, one secured to each of the shaft sections, and planetary gearing interposed between each of the opposed gears and the corresponding member of the last mentioned pair of gears.

2. A differential construction comprising in combination with alined sections of a divided shaft, a casing, means for causing the casing to turn about the axis of the divided shaft, differential pinions carried by the casing and mounted to turn about axes radial in respect to the axis of the divided shaft, gears with which the pinions are in mesh, a pair of gears, one secured to each of the shaft sections, and planetary gearing interposed between each of the first mentioned gears and the corresponding member of the last mentioned pair of gears.

3. A differential construction comprising in combination with alined sections of a divided shaft, supporting means rotatable about the axis of the divided shaft, a differential pinion carried by the supporting means, opposed gears driven by the differential pinion, a second pair of gears rigid with the supporting member, a third pair of gears, one interposed between each of the opposed gears and the corresponding gear secured to the supporting member, said last mentioned pair of gears being capable of traveling in circular paths about the axis of the divided shaft, a fourth pair of gears, one secured to each of the sections of the shaft, and means for causing the third pair of gears to turn the fourth pair of gears.

4. A differential construction comprising in combination with alined sections of a divided shaft, a casing, means for causing the casing to turn about the axis of the divided shaft, differential pinions carried by the casing and mounted to turn about axes radial in respect to the axis of the divided shaft, gears with which the pinions are in mesh, a second pair of gears with which the pinions are, respectively, in mesh, said second pair of gears being mounted for movement in circular paths about the axis of the divided shaft, a third pair of gears rigid with the casing, the members of the third pair being in mesh, respectively, with the members of the second pair, a fourth pair of gears, one secured to each of the shaft sections, and a fifth pair of gears rigidly connected with the corresponding members of the second pair and being in mesh with the corresponding members of the fourth pair.

5. A differential construction comprising in combination with alined sections of a divided shaft, supporting means rotatable about the axis of the divided shaft, a differential pinion carried by the supporting means, opposed gears driven by the differential pinion, a pair of gears, one secured to each of the shaft sections, planetary gearing interposed between each of the opposed gears and the corresponding member of the last mentioned pair of gears, and means for locking one of the gears to the supporting means.

6. A differential construction comprising in combination with alined sections of a divided shaft, supporting means rotatable about the axis of the divided shaft, a differential pinion carried by the supporting means, opposed gears driven by the differential pinion, a pair of gears, one secured to each of the shaft sections, planetary gearing interposed between each of the opposed gears and the corresponding member of the last mentioned pair of gears, and a spring pressed bolt carried by the supporting means and engageable with one of the opposed gears at will to prevent relative rotation of the gears.

7. A differential construction comprising in combination with alined sections of a divided shaft, supporting means rotatable about the axis of the divided shaft, a differential pinion carried by the supporting means, opposed gears driven by the differential pinion and provided with internal teeth, gears secured to the alined sections of the divided shaft, pinions between said gears and the internal teeth of the opposed gears, and means to support said pinions.

8. A differential construction comprising in combination with alined sections of a divided shaft, supporting means rotatable about the axis of the divided shaft, a differential pinion carried by the supporting means, opposed gears driven by the differential pinion and provided with internal teeth, gears secured to the alined sections of the divided shaft, pinions between said gears and the internal teeth of the opposed gears, means to support said pinions, and means for locking one of the opposed gears to the supporting member of the differential pinion.

9. A differential construction comprising in combination with alined sections of a divided shaft, supporting means revoluble about the axis of the shaft, a differential bevel gear mounted on said supporting means, a pair of opposed gear rings, each having lateral bevel teeth meshing with said bevel gear and also having internal teeth, and a gearing structure for operatively connecting each ring with the adjacent section of the divided shaft.

In testimony whereof I have signed this specification.

WILLIAM MENNIE.

of the divided shaft, a fourth pair of gears, one secured to each of the sections of the shaft, and means for causing the third pair of gears to turn the fourth pair of gears.

4. A differential construction comprising in combination with alined sections of a divided shaft, a casing, means for causing the casing to turn about the axis of the divided shaft, differential pinions carried by the casing and mounted to turn about axes radial in respect to the axis of the divided shaft, gears with which the pinions are in mesh, a second pair of gears with which the pinions are, respectively, in mesh, said second pair of gears being mounted for movement in circular paths about the axis of the divided shaft, a third pair of gears rigid with the casing, the members of the third pair being in mesh, respectively, with the members of the second pair, a fourth pair of gears, one secured to each of the shaft sections, and a fifth pair of gears rigidly connected with the corresponding members of the second pair and being in mesh with the corresponding members of the fourth pair.

5. A differential construction comprising in combination with alined sections of a divided shaft, supporting means rotatable about the axis of the divided shaft, a differential pinion carried by the supporting means, opposed gears driven by the differential pinion, a pair of gears, one secured to each of the shaft sections, planetary gearing interposed between each of the opposed gears and the corresponding member of the last mentioned pair of gears, and means for locking one of the gears to the supporting means.

6. A differential construction comprising in combination with alined sections of a divided shaft, supporting means rotatable about the axis of the divided shaft, a differential pinion carried by the supporting means, opposed gears driven by the differential pinion, a pair of gears, one secured to each of the shaft sections, planetary gearing interposed between each of the opposed gears and the corresponding member of the last mentioned pair of gears, and a spring pressed bolt carried by the supporting means and engageable with one of the opposed gears at will to prevent relative rotation of the gears.

7. A differential construction comprising in combination with alined sections of a divided shaft, supporting means rotatable about the axis of the divided shaft, a differential pinion carried by the supporting means, opposed gears driven by the differential pinion and provided with internal teeth, gears secured to the alined sections of the divided shaft, pinions between said gears and the internal teeth of the opposed gears, and means to support said pinions.

8. A differential construction comprising in combination with alined sections of a divided shaft, supporting means rotatable about the axis of the divided shaft, a differential pinion carried by the supporting means, opposed gears driven by the differential pinion and provided with internal teeth, gears secured to the alined sections of the divided shaft, pinions between said gears and the internal teeth of the opposed gears, means to support said pinions, and means for locking one of the opposed gears to the supporting member of the differential pinion.

9. A differential construction comprising in combination with alined sections of a divided shaft, supporting means revoluble about the axis of the shaft, a differential bevel gear mounted on said supporting means, a pair of opposed gear rings, each having lateral bevel teeth meshing with said bevel gear and also having internal teeth, and a gearing structure for operatively connecting each ring with the adjacent section of the divided shaft.

In testimony whereof I have signed this specification.

WILLIAM MENNIE.

---

It is hereby certified that in Letters Patent No. 1,193,709, granted August 8, 1916, upon the application of William Mennie, of Detroit, Michigan, for an improvement in "Differential Gearing," errors appear in the printed specification requiring correction as follows: Page 2, line 26, for the word "pinions" read *pinion;* same page, strike out line 32 and insert the words and reference-numerals *nearer the pinions 22—23 are of the size of;* and that the said Letters Patent should be read with these corrections therein that the same may conform to the record of the case in the Patent Office.

Signed and sealed this 5th day of September, A. D., 1916.

[SEAL.]

F. W. H. CLAY,
*Acting Commissioner of Patents.*

It is hereby certified that in Letters Patent No. 1,193,709, granted August 8, 1916, upon the application of William Mennie, of Detroit, Michigan, for an improvement in "Differential Gearing," errors appear in the printed specification requiring correction as follows: Page 2, line 26, for the word "pinions" read *pinion;* same page, strike out line 32 and insert the words and reference-numerals *nearer the pinions 22—23 are of the size of;* and that the said Letters Patent should be read with these corrections therein that the same may conform to the record of the case in the Patent Office.

Signed and sealed this 5th day of September, A. D., 1916.

[SEAL.]

F. W. H. CLAY,
*Acting Commissioner of Patents.*